United States Patent
Kamei

(10) Patent No.: US 10,618,440 B2
(45) Date of Patent: Apr. 14, 2020

(54) VEHICLE SEAT AND RECLINING MECHANISM COVER USED FOR THE SAME

(71) Applicant: TACHI-S CO., LTD., Akishima-shi, Tokyo (JP)

(72) Inventor: Yasuhiko Kamei, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/074,021

(22) PCT Filed: Feb. 27, 2017

(86) PCT No.: PCT/JP2017/007538
§ 371 (c)(1),
(2) Date: Jul. 30, 2018

(87) PCT Pub. No.: WO2017/163772
PCT Pub. Date: Sep. 28, 2017

(65) Prior Publication Data
US 2019/0039487 A1 Feb. 7, 2019

(30) Foreign Application Priority Data
Mar. 23, 2016 (JP) ................. 2016-058559

(51) Int. Cl.
*B60N 2/68* (2006.01)
*B60N 2/20* (2006.01)
(Continued)

(52) U.S. Cl.
CPC ............... *B60N 2/58* (2013.01); *A47C 1/024* (2013.01); *B60N 2/20* (2013.01); *B60N 2/90* (2018.02)

(58) Field of Classification Search
CPC ............... B60N 2/20; B60N 2/58; B60N 2/90
(Continued)

(56) References Cited

U.S. PATENT DOCUMENTS

| 5,833,313 A | 11/1998 | Kaneda et al. |
| 8,366,146 B2 * | 2/2013 | Yamaki ............... B60N 2/4235 280/730.2 |

(Continued)

FOREIGN PATENT DOCUMENTS

| JP | H09-188178 A | 7/1997 |
| JP | H11-105598 A | 4/1999 |
| JP | 2015-085839 A | 5/2015 |

OTHER PUBLICATIONS

International Search Report from International Patent Application No. PCT/JP2017/007538, dated May 23, 2017.

*Primary Examiner* — Rodney B White
(74) *Attorney, Agent, or Firm* — SGPatents PLLC

(57) ABSTRACT

A reclining mechanism cover for covering hinge portions (15) of a reclining mechanism in a vehicle seat includes a seat front right reclining mechanism cover (11) and a seat front left reclining mechanism cover (12) which cover, from the front of a seat back the hinge portions on the left and right sides in the width direction of the seat back; and a seat lower reclining mechanism cover (10) which comprises left and right rear reclining mechanism covers that cover, from the rear of the seat back, the left and right hinge portions (15) of the seat back and a seat back rear covering component that is integral with the seat back rear reclining mechanism covers. This reclining mechanism cover is mounted to the seat back frame (4) of the seat back via the seat lower reclining mechanism cover (10).

4 Claims, 3 Drawing Sheets

(51) Int. Cl.
*B60N 2/90* (2018.01)
*B60N 2/58* (2006.01)
*A47C 1/024* (2006.01)

(58) Field of Classification Search
USPC .......................... 297/216.13, 452.18, 452.2
See application file for complete search history.

(56) References Cited

U.S. PATENT DOCUMENTS

| | | | | |
|---|---|---|---|---|
| 8,827,362 B2* | 9/2014 | Yamaki | ................ | B60N 2/4235 |
| | | | | 297/216.13 |
| 9,010,855 B2* | 4/2015 | Yamaki | ................ | B60N 2/0232 |
| | | | | 297/216.13 |
| 9,352,676 B1* | 5/2016 | Wright | ..................... | B60N 2/58 |
| 2007/0080574 A1* | 4/2007 | Sayed | ..................... | B60N 2/22 |
| | | | | 297/463.1 |
| 2009/0146485 A1* | 6/2009 | Inagaki | ................ | B60N 2/0224 |
| | | | | 297/463.1 |
| 2010/0090515 A1* | 4/2010 | Yamazaki | ............ | B60N 2/6009 |
| | | | | 297/463.1 |
| 2012/0217775 A1* | 8/2012 | Fujita | ................... | B60N 2/4221 |
| | | | | 297/216.13 |
| 2012/0306253 A1* | 12/2012 | Seibold | .................... | B60N 2/68 |
| | | | | 297/354.1 |
| 2012/0313408 A1* | 12/2012 | Nagata | ................. | B60N 2/4235 |
| | | | | 297/216.1 |
| 2013/0069415 A1* | 3/2013 | Yasuda | .................. | B60N 2/682 |
| | | | | 297/452.18 |
| 2017/0028878 A1* | 2/2017 | Nakagawa | ............ | B60N 2/16 |
| 2017/0028883 A1* | 2/2017 | Kasuga | .................... | B60N 2/68 |
| 2017/0028942 A1* | 2/2017 | Nakagawa | ............... | B60N 2/90 |
| 2017/0028943 A1* | 2/2017 | Nakagawa | ............... | B60N 2/90 |
| 2017/0036577 A1* | 2/2017 | Llne | ........................ | B60N 2/68 |
| 2017/0259703 A1* | 9/2017 | Supernavage | ........ | B60N 2/3097 |
| 2018/0213936 A1* | 8/2018 | Sasaki | .................. | B60N 2/2227 |
| 2019/0092200 A1* | 3/2019 | Minegishi | ............. | B60N 2/682 |

* cited by examiner (A)

(B)

VEHICLE SEAT AND RECLINING MECHANISM COVER USED FOR THE SAME

TECHNICAL FIELD

The present invention relates to a vehicle seat, and more particularly to a reclining mechanism cover.

BACKGROUND OF THE INVENTION

The vehicle seat is normally equipped with a reclining mechanism for inclining a seat back forward and backward. Reclining mechanisms which include a forward tilt biasing spring, a mechanism for fixing the seat back at a desired forward or backward rotational angular position and the like are provided for implementation of a reclining function. A hinge portion of a side frame of the vehicle seat equipped with these reclining mechanisms is covered with a reclining mechanism cover in consideration of visual appearance.

A prior art in the technical field of the reclining mechanism cover is disclosed in, for example, JP-A No. 2015-85839 (Patent Literature 1). Patent Literature 1 suggests a shield structure where the hinge portion is covered by a cover body on opposite sides of a hinge shaft of the hinge portion. An inside shield is divided to be assembled to the cover in a direction perpendicular to a width direction of the seat so as to form the inside shield. This configuration permits the inside shield and an outside shield to be positioned in face-to-face alignment to form the shield for the side frame even when space is insufficient for allowing the inside shield to be inserted in the inside of the side frame and to be moved in the width direction of the seat.

CITATION LIST

Patent Literature

Patent Literature 1: JP-A No. 2015-85839

SUMMARY OF THE INVENTION

Patent Literature 1 suggests that workability is improved by forming the cover for covering the hinge portion of the reclining mechanism using divided inner cover and outer cover. However, no statement is made on a component for covering a high-risk portion not compliant with vehicular interior projection requirements such as a projection on a rear side of the seat back. Hence, it has been a common practice to cover the high-risk portion with a discrete component.

The invention has been accomplished in view of the foregoing problems and an object thereof is to provide a vehicle seat which is adapted for integral construction of the reclining mechanism cover and the seat back rear covering component, so as to achieve the reduction of parts count and enhanced safety and to satisfy legal requirements.

According to an aspect of the invention for achieving the above object, a vehicle seat includes a seat back rotatable about a hinge portion including a reclining mechanism, and has a configuration in which a reclining mechanism cover for covering the hinge portion includes: a seat front right reclining mechanism cover for covering, from a foreside of the seat back, a right hinge portion with respect to a width of the seat back; a seat front left reclining mechanism cover for covering, from the foreside of the seat back, a left hinge portion with respect to the width of the seat back; and a seat lower reclining mechanism cover which includes right and left rear reclining mechanism covers for covering the right and left hinge portions of the seat back from a rear side of the seat back, and a seat back rear covering component integrally constructed with the rear reclining mechanism covers, and in which the reclining mechanism cover is mounted to a seat back frame constituting the seat back via the seat lower reclining mechanism cover.

The invention can provide a reclining mechanism cover which is less costly and highly safe and also satisfies the legal requirements as well as a vehicle seat using the same.

DETAILED DESCRIPTION OF THE PREFERRED EMBODIMENTS

An embodiment of the invention will hereinbelow be described with reference to the accompanying drawings.

Embodiment

First, description is made on a reclining mechanism cover and a seat back rear covering component of prior art.

Figure 5:
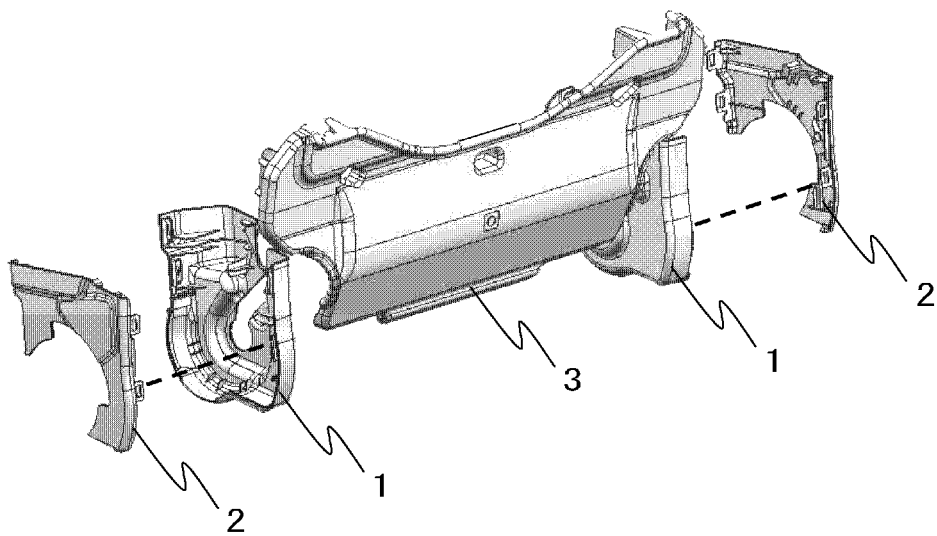
FIGS. 5A and 5B are perspective views illustrating a reclining mechanism cover and a seat back rear covering component of prior art.
Figure 5:
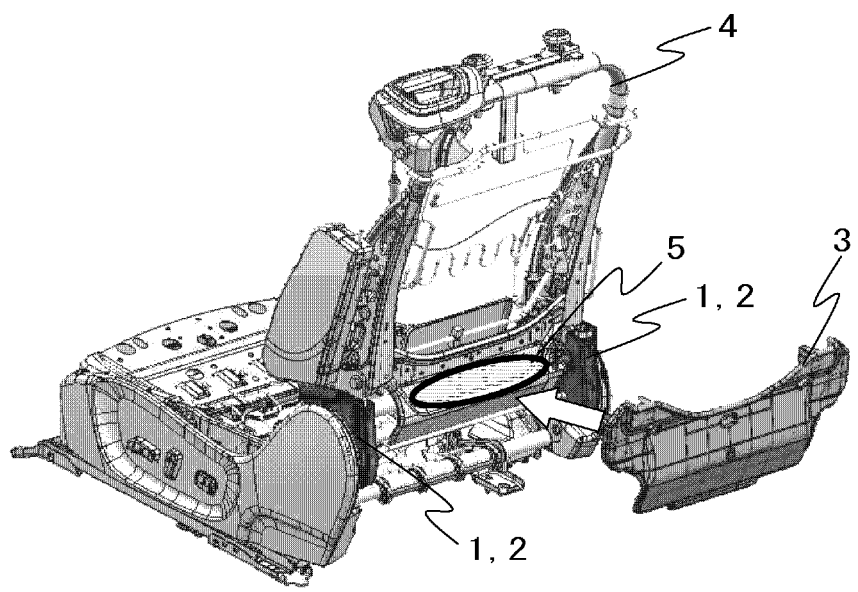

FIGS. 5A and 5B are perspective views illustrating the reclining mechanism cover and seat back rear covering component of prior art. FIG. 5A is a perspective configuration diagram and FIG. 5B is a perspective view schematically showing a method of mounting the reclining mechanism cover to a vehicle seat. In FIG. 5A, indicated at 1 is an inner cover on an inner side of a cover for covering a hinge portion of a reclining mechanism, while indicated at 2 is an outer cover on an outer side of the cover. Indicated at 3 is a seat back rear covering component for covering an interior high-risk portion such as a projection on a rear side of the seat back which does not satisfy the interior projections regulation.

Referring to FIG. 5B illustrating the method of mounting the reclining mechanism cover to the vehicle seat, the inner cover 1 and the outer cover 2 are first mounted to a hinge portion of the reclining mechanism on either side of the seat. Subsequently, the seat back rear covering component 3 is mounted to a seat back frame 4 in a manner to cover an interior projections regulation non-compliant region 5 including the projection or the like.

As just described, it has been the conventional practice that the seat back rear covering component 3 as a separate member from the inner cover 1 and the outer cover 2 for use in reclining mechanism is prepared and mounted discretely. Accordingly, the seat cover includes five parts which include the right and left inner covers 1, the right and left outer covers 2 and the seat back rear covering component 3. In the case where the inner cover 2 is divided into two portions as set forth in Patent Literature 1, the number of parts is further increased, resulting in the increase in parts cost and assembly costs. When the seat back rear covering component 3 is dispensed in order to reduce the parts count, the seat cover fails to satisfy the interior projections regulation, or the legal requirements.

In this connection, a configuration according to an embodiment of the invention for solving the above problem is described as below.

Figure 1:
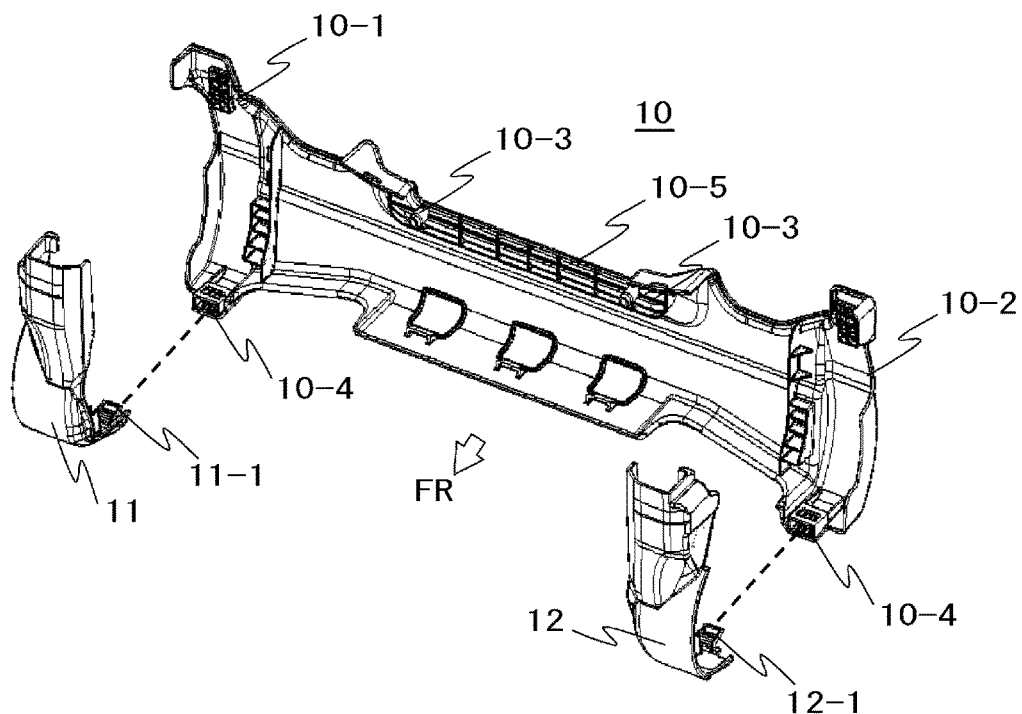
FIG. 1 is a perspective view showing a reclining mechanism cover according to an embodiment of the invention.

FIG. 1 is a perspective view of a reclining mechanism cover according to the embodiment. In FIG. 1, FR denotes an abbreviation for Front so that the arrowed direction denotes the front direction of the vehicle seat. Indicated at 10 is a seat lower reclining mechanism cover which is disposed at a lower part of the vehicle seat (hereinafter, abbreviated as "seat") so as to cover a reclining mechanism from a rear side of the seat. Indicated at 11 is a seat front right reclining mechanism cover which covers a right-side reclining mechanism from a front side of the seat. Similarly, indicated at 12 is a seat front left reclining mechanism cover which covers a left-side reclining mechanism from the front side of the seat. The seat lower reclining mechanism cover 10 is mated with a seat back rear covering component 10-5 (component for covering a rear side of a seat back) as a protection cover for covering a minor R-shape not satisfying the interior projections regulation, and also with the seat front reclining mechanism covers 11 and 12, thus forming a structure integrating components 10-1 and 10-2 equivalent to a seat rear reclining mechanism cover which constitutes a cover for covering the hinge portion of the reclining mechanism. Further, indicated as 10-3 is a projection which is used when the seat lower reclining mechanism cover 10 (described hereinafter) is mounted to the seat back frame. Indicated at 10-4 is a recess to be mated with the seat front reclining mechanism covers 11 and 12. Indicated at 11-1 and 12-1 is a projection to be mated with the recess 10-4 of the seat lower reclining mechanism cover 10.

This configuration is adapted for integral construction of the reclining mechanism cover and the seat back rear covering component, providing a reclining mechanism cover which achieves the reduction of parts count, parts cost and assembly costs as well as enhanced safety, and satisfies the legal requirements.

Figure 2:
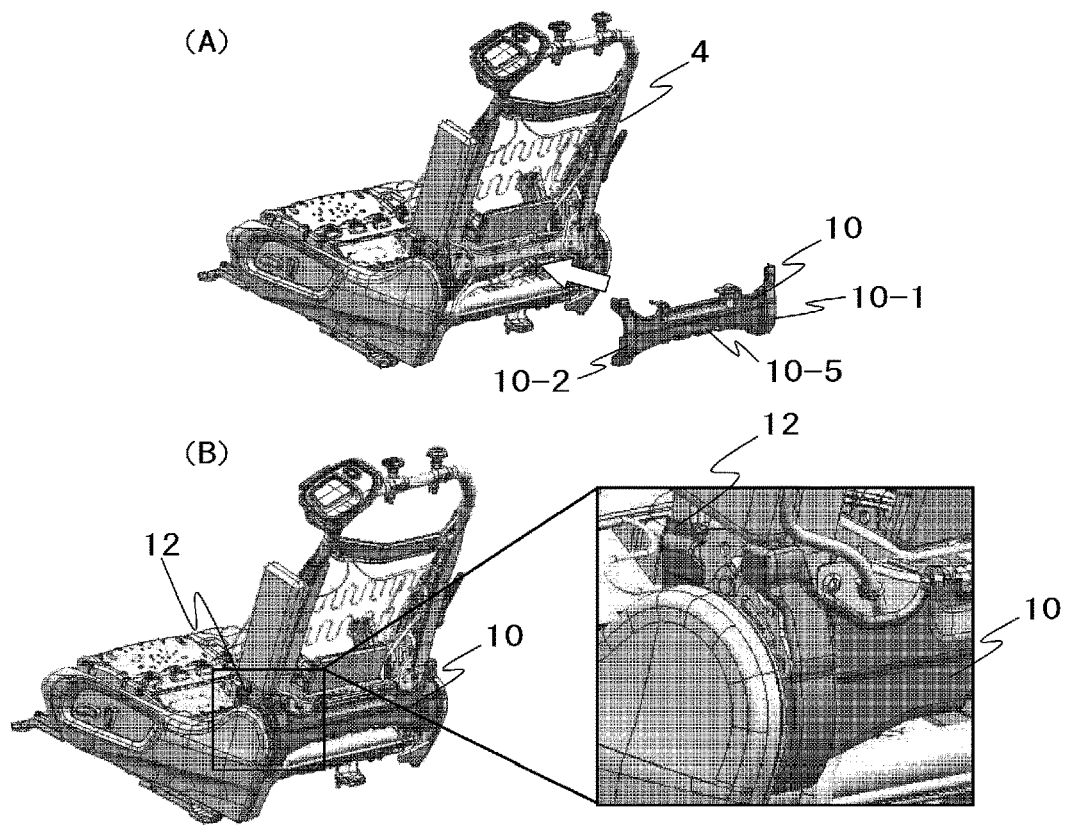
FIGS. 2A and 2B are perspective views schematically showing a method of mounting the reclining mechanism cover according to the embodiment hereof.

FIGS. 2A and 2B are perspective views schematically showing a method of mounting the reclining mechanism cover of the embodiment. As shown in FIG. 2A, the seat lower reclining mechanism cover 10 is attached to the seat back frame 4. As shown in FIG. 2B, the seat lower reclining mechanism cover 10 is mounted in place by connecting the seat lower reclining mechanism cover 10 with the seat front right reclining mechanism cover 11 and the seat front left reclining mechanism cover 12. Incidentally, a view on the right side of FIG. 2B is an enlarged view showing in enlarged dimension an area of the perspective view on the left side.

Next, description is made on an example of a specific mounting mechanism for the reclining mechanism cover of the embodiment and the mounting method thereof.

Figure 3:
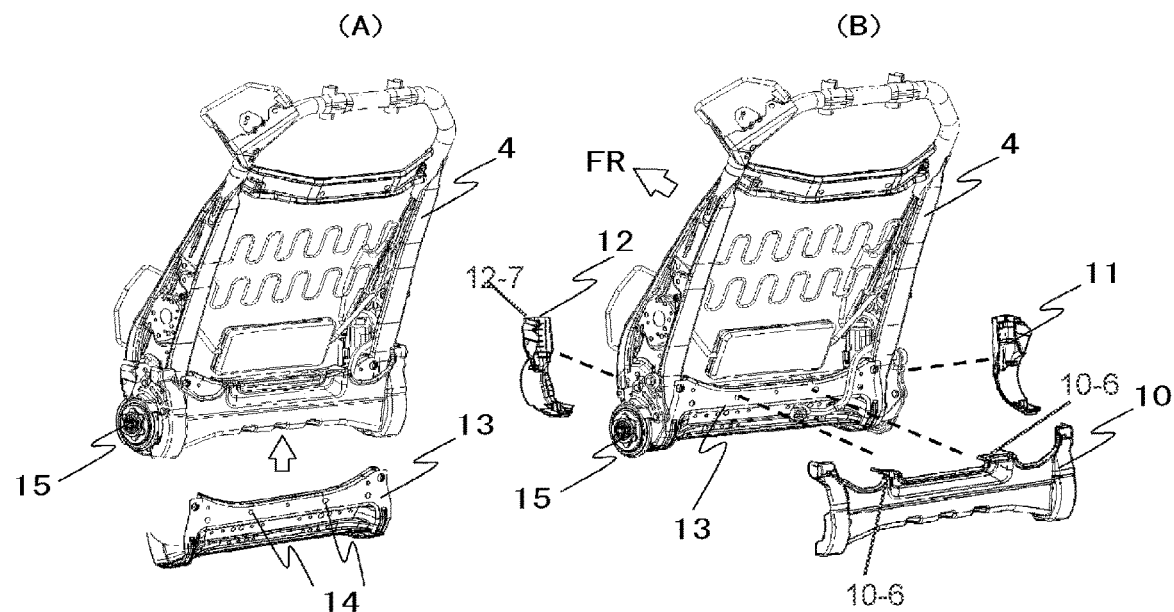
FIGS. 3A and 3B are perspective views showing a specific method of mounting the reclining mechanism cover according to the embodiment hereof.

FIGS. 3A and 3B are perspective views showing the specific method of mounting the reclining mechanism cover of the embodiment. First, as shown in FIG. 3A, a frame rear lower panel 13 to be disposed at a rear lower part of the seat back frame 4 is attached to the seat back frame 4 for a different purpose. The frame rear lower panel 13 is formed with holes 14 for mounting the seat lower reclining mechanism cover 10 to be described hereinlater. Indicated at 15 is a hinge portion of the reclining mechanism which is provided with unillustrated forward tilt biasing spring and mechanism for fixing the seat back at a desired forward or backward rotational angular position such as to implement the reclining mechanism. The seat back is configured to rotate back and forth about this hinge portion. Subsequently, as shown in FIG. 3B, the seat lower reclining mechanism cover 10, the seat front right reclining mechanism cover 11 and the seat front left reclining mechanism cover 12 are mounted to the seat back frame 4 via the frame rear lower panel 13. The details are described as below.

Figure 4:
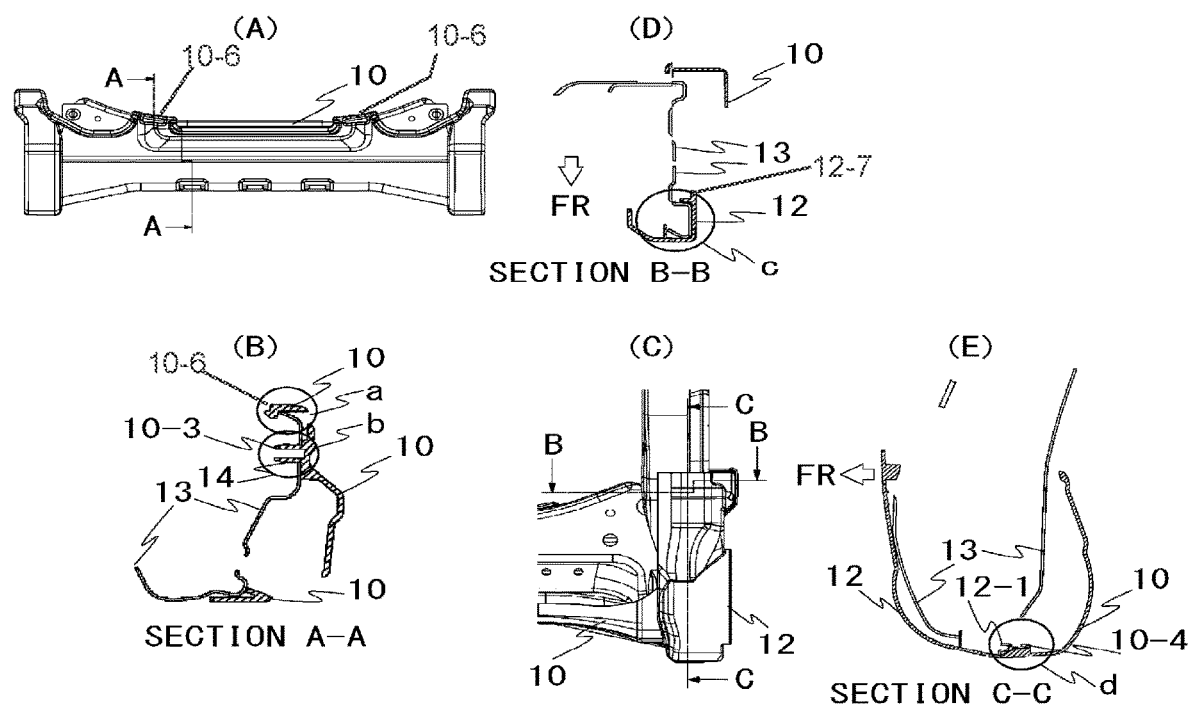
FIGS. 4A to 4E are configuration diagrams illustrating a specific method of mounting the reclining mechanism cover according to the embodiment hereof and mechanisms for the mounting purpose.

FIGS. 4A to 4E are configuration diagrams illustrating the specific method of mounting the reclining mechanism cover and mounting mechanisms according to the embodiment. FIG. 4A is a rear view of the seat lower reclining mechanism cover 10 and FIG. 4B is a sectional view taken on the line A-A in FIG. 4A. At an encircled region 'a' as seen in FIG. 4B, a claw 10-6 of the seat lower reclining mechanism cover 10 is engaged with the frame rear lower panel 13. Further at another encircled region 'b', the projection 10-3 of the seat lower reclining mechanism cover 10 is mounted in the hole 14 of the frame rear lower panel 13. Thus, the seat lower reclining mechanism cover 10 is mounted to the frame rear lower panel 13. FIG. 4C is a front view of the seat lower reclining mechanism cover 10 and the seat front left reclining mechanism cover 12 as seen from the front. FIG. 4D is a sectional view of the seat lower reclining mechanism cover 10 and the seat front left reclining mechanism cover 12 taken on the line B-B in FIG. 4C or a top view thereof. The lower side as seen in FIG. 4D is the foreside of the vehicle seat. At an encircled region 'c' as seen in FIG. 4D, the claw 12-7 of the seat front left reclining mechanism cover 12 is engaged with the frame rear lower panel 13. Thus, the seat front left reclining mechanism cover 12 is secured to the frame rear lower panel 13. The seat front right reclining mechanism cover 11 is in a symmetrical relation with the seat front left reclining mechanism cover 12. Hence, the seat front right reclining mechanism cover 11 is secured to the frame rear lower panel 13 in the same way but the description of how to do it is dispensed with. FIG. 4E is a sectional view taken on the line C-C in FIG. 4C, or a side view thereof. The left side as seen in FIG. 4E is the foreside of the vehicle seat. At an encircled region 'd' as seen in FIG. 4E, the projection 12-1 of the seat front left reclining mechanism cover 12 is mated with the recess 10-4 of the seat lower reclining mechanism cover 10. Thus, the seat front left reclining mechanism cover 12 is mated with the seat lower reclining mechanism cover 10. The seat front right reclining mechanism cover 11 is in a symmetrical relation with the seat front left reclining mechanism cover 12. Hence, the seat front right reclining mechanism cover 11 is mated with the seat lower reclining mechanism cover 10 in the same way but the description of how to do it is dispensed with.

As just described, an advantage of facilitating an operation of mounting the reclining mechanism cover is offered by the method of forming the existing reclining mechanism cover and the seat back rear covering component in the integral structure and mounting the resultant rear cover part to the seat back frame 4. According to the above description of the mounting process, the seat lower reclining mechanism cover 10 as the rear cover part is mounted in place by means of claw engagement. However, the mounting method is not limited to this but a screw fastening structure and the like may also be applied.

According to the embodiment as described above, the vehicle seat including the seat back rotatable about the hinge portion including the reclining mechanism has the configuration where the reclining mechanism cover for covering the hinge portion includes: the seat front right reclining mechanism cover for covering, from the foreside of the seat back, the right hinge portion with respect to the width of the seat back; the seat front left reclining mechanism cover for covering, from the foreside of the seat back, the left hinge portion with respect to the width of the seat back; and the seat lower reclining mechanism cover which includes the right and left rear reclining mechanism covers for covering the right and left hinge portions from the rear side of the seat back, and the seat back rear covering component integrally constructed with the rear reclining mechanism covers, and where the reclining mechanism cover is mounted to the seat back frame constituting the seat back via the seat lower reclining mechanism cover.

Thus, the embodiment is adapted for the integral construction of the reclining mechanism cover and the seat back rear covering component, and can provide the reclining mechanism cover which achieves the reduction of parts count, parts cost and assembly costs and also enhanced safety and satisfies the legal requirements by protecting the high-risk minor R-shape, as well as the vehicle seat using the same.

While the embodiment has been described above, the invention is not limited to the above embodiment but can include a variety of modifications. The foregoing embodiment is a detailed description for clarity of the invention but is not necessarily limited to what includes all the described components.

REFERENCE SIGNS LIST

1: inner cover
2: outer cover
3,10-5: seat back rear covering component
4: seat back frame
5: interior projections regulation non-compliant region
10: seat lower reclining mechanism cover
11: seat front right reclining mechanism cover
12: seat front left reclining mechanism cover
10-3: projection
10-4: recess
11-1,12-1: projection
13: frame rear lower panel
14: hole
15: hinge portion

What is claimed is:

1. A vehicle seat comprising a seat back rotatable about a hinge portion including a reclining mechanism, wherein
a reclining mechanism cover for covering the hinge portion includes: a seat front right reclining mechanism cover for covering, from a foreside of the seat back, a right hinge portion with respect to a width of the seat back; a seat front left reclining mechanism cover for covering, from the foreside of the seat back, a left hinge portion with respect to the width of the seat back; and a seat lower reclining mechanism cover which includes right and left rear reclining mechanism covers for covering the right and left hinge portions of the seat back from a rear side of the seat back, and a seat back rear covering component integrally constructed with the rear reclining mechanism covers, and
the reclining mechanism cover is mounted to a seat back frame of the seat back via the seat lower reclining mechanism cover, and
the seat front right reclining mechanism cover and the seat front left reclining mechanism cover are mounted in place by mating with the seat lower reclining mechanism cover.

2. The vehicle seat according to claim 1, wherein
a frame rear lower panel is mounted to the seat back frame, and
the reclining mechanism cover is mounted to the seat back frame by mounting the seat lower reclining mechanism cover to the frame rear lower panel.

3. The vehicle seat according to claim 2, wherein
the reclining mechanism cover is mounted to the seat back frame by hooking a claw of the seat lower reclining mechanism cover on the frame rear lower panel and setting a projection of the seat lower reclining mechanism cover in a hole of the frame rear lower panel.

4. A reclining mechanism cover for a vehicle seat including a seat back rotatable about a hinge portion including a reclining mechanism, the reclining mechanism cover comprising:
a seat front right reclining mechanism cover for covering, from a foreside of the seat back, a right hinge portion with respect to a width of the seat back; a seat front left reclining mechanism cover for covering, from the foreside of the seat back, a left hinge portion with respect to the width of the seat back; and a seat lower reclining mechanism cover which includes right and left rear reclining mechanism covers for covering the right and left hinge portions of the seat back from a rear side of the seat back, and a seat back rear covering component integrally constructed with the rear reclining mechanism covers, wherein
the reclining mechanism cover is mounted to a seat back frame of the seat back via the seat lower reclining mechanism cover, and
the seat front right reclining mechanism cover and the seat front left reclining mechanism cover are mounted in place by mating with the seat lower reclining mechanism cover.

* * * * *